(12) United States Patent
Miura et al.

(10) Patent No.: US 10,003,910 B2
(45) Date of Patent: *Jun. 19, 2018

(54) DATA COMMUNICATION SYSTEM FOR AGRICULTURAL MACHINE

(71) Applicant: KUBOTA CORPORATION, Osaka (JP)

(72) Inventors: Keisuke Miura, Sakai (JP); Isao Tanaka, Sakai (JP); Yasuhisa Uoya, Sakai (JP); Takafumi Morishita, Sakai (JP); Yoshito Hayakawa, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 15 days.

This patent is subject to a terminal disclaimer.

(21) Appl. No.: 14/388,526

(22) PCT Filed: Sep. 20, 2013

(86) PCT No.: PCT/JP2013/075404
§ 371 (c)(1),
(2) Date: Sep. 26, 2014

(87) PCT Pub. No.: WO2014/050713
PCT Pub. Date: Apr. 3, 2014

(65) Prior Publication Data
US 2015/0052581 A1 Feb. 19, 2015

(30) Foreign Application Priority Data

Sep. 28, 2012 (JP) ................................ 2012-217778

(51) Int. Cl.
*G06F 7/04* (2006.01)
*H04W 4/00* (2018.01)
(Continued)

(52) U.S. Cl.
CPC ............ *H04W 4/006* (2013.01); *G06F 21/44* (2013.01); *H04L 9/321* (2013.01); *H04L 63/08* (2013.01);
(Continued)

(58) Field of Classification Search
CPC .......... G06F 21/44; G06F 21/31; G06F 21/35; G06F 17/00; G06F 19/00; G06F 21/34;
(Continued)

(56) References Cited

U.S. PATENT DOCUMENTS

2008/0150677 A1* 6/2008 Arakawa ............. B60R 25/2018
340/5.2
2009/0034725 A1* 2/2009 Davies, Sr. ............. H04L 63/08
380/255

(Continued)

FOREIGN PATENT DOCUMENTS

CN 102571345 7/2012
JP A11-053674 2/1999
(Continued)

OTHER PUBLICATIONS 2006-246536—Machine translation of application JP2008-070133A.*
(Continued)

*Primary Examiner* — Farid Homayounmehr
*Assistant Examiner* — Lizbeth Torres-Diaz
(74) *Attorney, Agent, or Firm* — Greenblum & Bernstein, P.L.C.

(57) ABSTRACT

Data on agricultural machines can be outputted to mobile terminals easily and properly. A data collection device is provided separately from a control device that controls the operation of an agricultural machine and is connected to a vehicle communication network installed in the agricultural machine, and is removably connected to the vehicle com-
(Continued)

munication network. The data collection device includes a data collection unit for collecting agricultural machine data outputted to the vehicle communication network, an authorization determination unit for implementing authentication with a mobile terminal to determine whether or not the collected data is transmitted to the mobile terminal by wireless communication, and a data communication unit for transmitting data to the mobile terminal by wireless communication when the authorization determination unit authorizes data transmission.

3 Claims, 9 Drawing Sheets

(51) Int. Cl.
  *H04L 29/06*  (2006.01)
  *H04L 29/08*  (2006.01)
  *G06F 21/44*  (2013.01)
  *H04W 12/06*  (2009.01)
  *H04L 9/32*  (2006.01)

(52) U.S. Cl.
  CPC .............. *H04L 67/06* (2013.01); *H04W 4/38* (2018.02); *H04W 12/06* (2013.01); *H04L 2209/80* (2013.01)

(58) Field of Classification Search
  CPC .............. H04W 12/06; H04L 2209/80; H04L 2209/84; H04L 63/104; H04L 67/12; H04L 9/3226; H04L 9/3234; H04L 63/0407; H04L 63/20
  See application file for complete search history.

(56) References Cited

U.S. PATENT DOCUMENTS

| 2010/0077451 | A1* | 3/2010 | Fujimoto | G06F 21/10 726/3 |
|---|---|---|---|---|
| 2011/0279253 | A1* | 11/2011 | Suda | G06Q 10/0833 340/431 |
| 2012/0095642 | A1* | 4/2012 | Nishida | H04L 9/3226 701/31.4 |
| 2012/0140752 | A1* | 6/2012 | Yun | B60L 11/1846 370/338 |

FOREIGN PATENT DOCUMENTS

| JP | 2008-070133 | A | | 3/2008 |
|---|---|---|---|---|
| JP | 2008070133 | A | * | 3/2008 |
| JP | 2012-088913 | A | | 5/2012 |
| JP | 2012-136210 | A | | 7/2012 |
| WO | 2012/110508 | | | 8/2012 |

OTHER PUBLICATIONS

U.S. Appl. No. 14/388,457 to Keisuke Miura et al., which was filed Sep. 26, 2014.

European Search Report issued in Counterpart Patent Appl. No. 13840803.4, dated Apr. 15, 2016.

Office Action issued in China family member Application No. 201380012682.1, dated Apr. 25, 2016.

* cited by examiner

Fig.2

| Agricultural machine identification information (Stored agricultural machine information) | | | | Mobile terminal identification information (Stored mobile information) | | |
|---|---|---|---|---|---|---|
| Tractor information | | Control device information | Data collection device | Phone number | User name | Address |
| Serial number | Model | Serial number | Serial number | | | |
| 10012 | M115A | TS-115-118 | NKJ-305665892 | 012-3456-7890 | A.K | Hokkaido |
| 10001 | M135A | TS-135-119 | NKJ-305665893 | 012-5149-1593 | Y.S | Niigata prefecture |
| 10002 | M135A | TS-135-123 | | 012-1863-5581 | S.T | Nagano prefecture |
| 10013 | M115A | TS-115-121 | NKJ-305665895 | 012-9354-2973 | M.H | Fukushima prefecture |
| 10003 | M135A | TS-135-122 | | 012-3954-8214 | K.R | Shiga prefecture |
| 10006 | M135A | TS-135-120 | NKJ-305665897 | 012-9472-2551 | I.K | Mie prefecture |
| ... | ... | ... | ... | ... | ... | ... |
| 10055 | M115A | TS-115-123 | NKJ-305665897 | 012-2515-4252 | T.S | Kochi prefecture |
| ... | ... | ... | ... | ... | ... | ... |

DATA COMMUNICATION SYSTEM FOR AGRICULTURAL MACHINE

TECHNICAL FIELD

The present invention relates to a data communication system for an agricultural machine for transmitting data relating to an agricultural machine, which is collected using a data collection device to the outside of the agricultural machine.

BACKGROUND ART

In recent years, to increase the efficiency of work in agricultural fields and improve the quality of crops harvested in agricultural fields, a demand for collecting and utilizing information on the work in the agricultural fields has increased. An example of a technique of collecting work information using an agricultural machine such as a combine harvester is an information management system disclosed in Patent Literature 1.

In the information management system disclosed in Patent Literature 1, a crop harvest machine includes crop quality measurement means adapted to measure the quality of harvested crops, and information output means adapted to output quality measurement information measured using the crop quality measurement means to the outside of the machine, and there are provided measurement information collection means adapted to collect the quality measurement information outputted from the information output means for each of a plurality of harvest places, and quality map generation means adapted to determine and output a crop quality map for each of regions corresponding to the harvest places, on the basis of the information collected using the measurement information collection means.

CITATION LIST

Patent Literature

Patent Literature 1: Japanese Unexamined Patent Publication JP-A 11-053674

SUMMARY OF INVENTION

Technical Problem

In Patent Literature 1, although the information output means configured of a wireless communication device can output the measurement information to the outside of the machine, in order to achieve wireless communication, various requirements including used radio wave band and communication mode must be satisfied. However, the fact is that the wireless communication technology has dramatically improved in recent years, and the standard for the communication mode has changed accordingly in a short period of time. A lot of wireless communication devices including the wireless communication device disclosed in Patent Literature 1 cannot address such change of the standard in a short period of time, and with the change of the radio wave band or the communication mode, data such as the measurement information cannot be outputted (transmitted) to the outside of the machine.

Thus, an object of the present invention is to provide a data communication system for an agricultural machine capable of easily outputting data relating to an agricultural machine to a mobile terminal by wireless communication.

Solution to Problem

To attain the object, the present invention takes following measures.

A data communication system for an agricultural machine according to a first aspect of the present invention includes: a data collection device configured to collect data relating to an agricultural machine; and a mobile terminal configured to receive the data collected by the data collection device by wireless communication. The data collection device is removably connected to a vehicle communication network separately from a control device configured to control operation of the agricultural machine, the control device connecting to the vehicle communication network installed in the agricultural machine, and includes: a data collection unit configured to collect the data of the agricultural machine, the data being outputted to the vehicle communication network; an authorization determination unit configured to authenticate the mobile terminal and to determine whether or not the collected data is transmitted to the mobile terminal by wireless communication; and a data communication unit configured to transmit the data to the mobile terminal by wireless communication when the authorization determination unit authorizes transmission of the data.

In the data communication system for an agricultural machine according to a second aspect of the present invention, the mobile terminal includes an authentication information output unit configured to output, to the data collection device, a first authentication information for authentication with the data collection device, the data collection device stores a second authentication information for authentication with the mobile terminal, and the authorization determination unit determines whether or not data transmission is authorized on the basis of the second authentication information and the first authentication information outputted from the authentication information output unit of the mobile terminal.

In the data communication system for an agricultural machine according to a third aspect of the present invention, the mobile terminal includes an identification information output unit configured to output a mobile terminal identification information to an external management server, the mobile terminal identification information identifying the mobile terminal, and the management server includes: a relation storage unit configured to store and relate an agricultural machine identification information and a mobile terminal identification information of the mobile terminal to each other, the agricultural machine identification information identifying either the agricultural machine or the data collection device; a relation determination unit configured to determine whether or not the mobile terminal identification information outputted from the identification information output unit is related to the agricultural machine identification information on the basis of: the mobile terminal identification information outputted from the identification information output unit; and the mobile terminal identification information and the agricultural machine identification information, the mobile terminal identification information and the agricultural machine identification information being stored in the relation storage unit; and an authorization information output unit configured to output, to the mobile terminal, a first authentication information corresponding to the mobile terminal identification information when the relation determination unit determines that the relation is made.

In the data communication system for an agricultural machine according to a fourth aspect of the present invention, the identification information output unit outputs the agricultural machine identification information and the mobile terminal identification information, the management server includes a registration unit configured to store and relate the mobile terminal identification information and the agricultural machine identification information to each other in the relation storage unit upon reception of the mobile terminal identification information and the agricultural machine identification information each outputted from the identification information output unit, and to issue the first authentication information, and the relation determination unit determines establishment of the relation upon issue of the first authentication information of the mobile terminal identification information and the agricultural machine identification information, the mobile terminal identification information and the agricultural machine identification information being outputted from the identification information output unit by the registration unit.

In the data communication system for an agricultural machine according to a fifth aspect of the present invention, the mobile terminal includes an identification information request unit configured to request the agricultural machine identification information to the data collection device. The data collection device outputs the agricultural machine identification information to the mobile terminal on the basis of the request from the identification information request unit, the agricultural machine identification information being stored in the data collection device.

In the data communication system for an agricultural machine according to a sixth aspect of the present invention, the authentication information output unit outputs, as the first authentication information, a first network key and a first authorization key other than the first network key, the data collection device stores, as a second information, a second network key and a second authorization key other than the second network key, and the authorization determination unit authenticates, in a first stage, the first network key outputted from the authentication information output unit with the second network key, authenticates, in a second stage after establishment of the authentication in the first stage, the first authorization key outputted from the authentication information output unit with the second authorization key, and authorizes data transmission upon establishment of the authentication between the first authorization key and the second authorization key.

Advantageous Effects of Invention

According to the first aspect of the present invention, by collecting data outputted to the vehicle communication network, data relating to the agricultural machine can be easily collected. Since the collected data is outputted by wireless communication only when the outputting is authorized through the authentication with the mobile terminal, the security level in outputting data by wireless communication can be improved. Further, since the data collection device itself is removable from the vehicle communication network and can be readily replaced, various technical changes for wireless communication (for example, change of radio wave band, communication mode, and so on) can be addressed to properly transmit data to the mobile terminal by wireless communication.

According to the second aspect of the present invention, it is determined whether or not data is outputted on the basis of the first authentication information outputted from the mobile terminal and the second authentication information stored in the data collection device, improving the security level.

According to the third aspect of the present invention, in the case where the agricultural machine identification information stored in the management server is related to the mobile terminal identification information outputted from the mobile terminal, the first authentication information is outputted to the mobile terminal. Therefore, the mobile terminal cannot obtain data collected by the data collection device unless the agricultural machine identification information is related to the mobile terminal identification information, further improving the security level.

According to the fourth aspect of the present invention, since the relation between the mobile terminal identification information and the agricultural machine identification information, and the issue of the first authentication information can be achieved at the same time, the mobile terminal can easily obtain data collected by the data collection device without lowering the security level.

According to the fifth aspect of the present invention, the mobile terminal cannot obtain data from the data collection device without using the agricultural machine identification information stored in the data collection device, further improving the security level.

According to the sixth aspect of the present invention, the mobile terminal cannot obtain data through the authentication through the network key and the authentication through the authorization key, further improving the security level.

BRIEF DESCRIPTION OF DRAWINGS

FIG. 2 is a table showing an example showing various information stored in a relation storage unit of a management server in the data communication system for an agricultural machine in the first embodiment.

DESCRIPTION OF EMBODIMENTS

Figure 1:
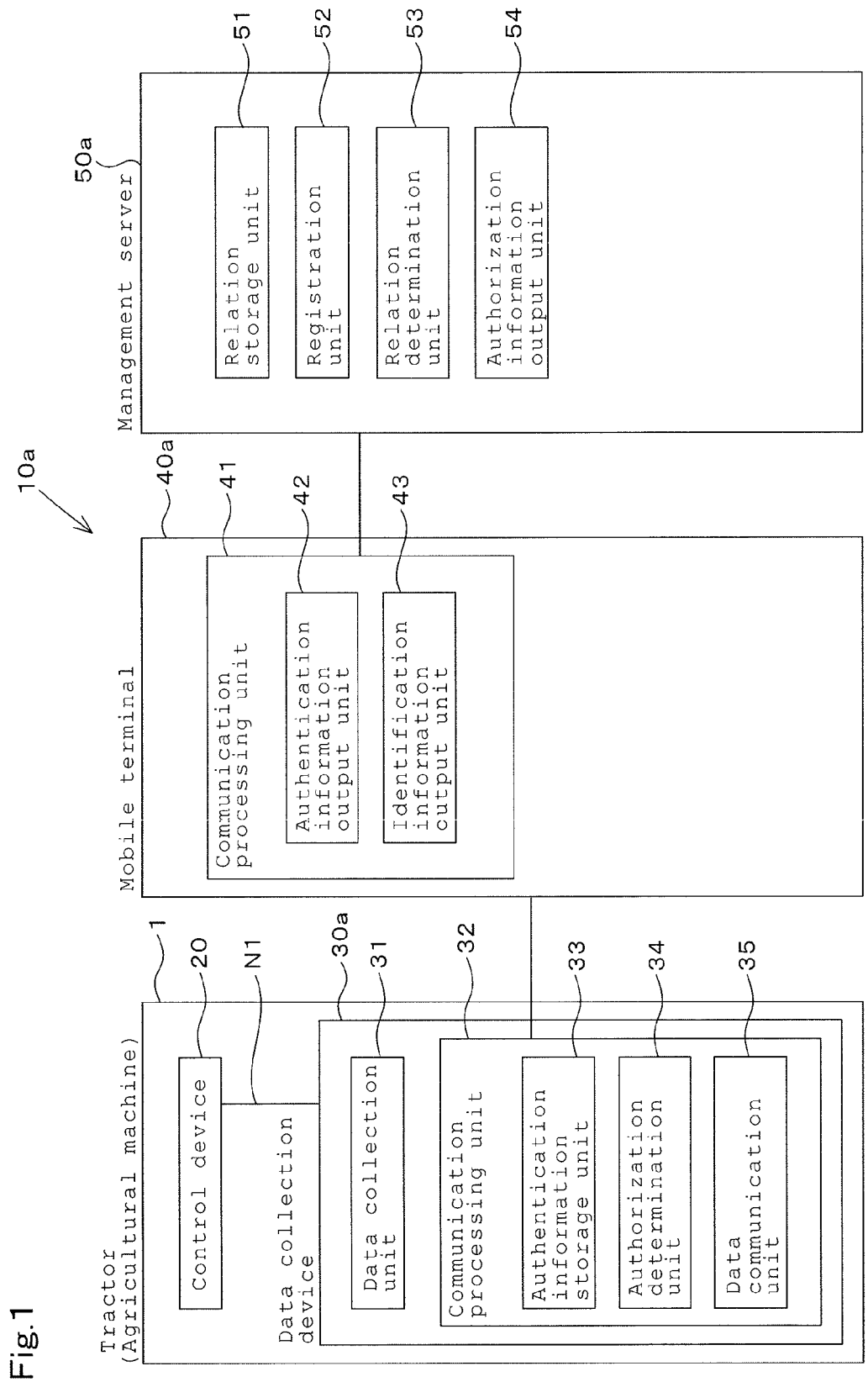
FIG. 1 is a diagram showing a schematic configuration of a data communication system for an agricultural machine in a first embodiment of the present invention.

A data communication system for an agricultural machine in each embodiment of the present invention will be described below with reference to figures. Through the below-mentioned embodiments and figures, the same components in the data communication system for an agricultural machine are given the same reference numerals and names. Accordingly, overlapping descriptions of the components having the same reference numerals and names are omitted.

First Embodiment

FIG. 1 is a diagram showing a schematic configuration of a data communication system for an agricultural machine 10a in a first embodiment of the present invention.

As shown in FIG. 1, the data communication system for an agricultural machine 10a includes a data collection device 30a for collecting data relating to a tractor 1 as a kind of the agricultural machine, and a mobile terminal 40a for receiving the data collected by the data collection device 30a at the outside of the tractor 1. The tractor 1 is provided with a control device 20 for performing driving control and work control of the tractor 1.

In the data communication system for an agricultural machine 10a in this embodiment, the data collection device 30a is provided separately from the control device 20 mounted in the tractor 1, can be removably attached to the tractor 1, and the removable data collection device 30a has a function of performing wireless communication so as to transmit collected data to the mobile terminal 40a as external equipment. The data communication system for agricultural machine 10a in this embodiment especially focuses on authentication processing of determining whether or not the data collected by the data collection device 30a is transmitted to the mobile terminal 40a.

Figure 9:
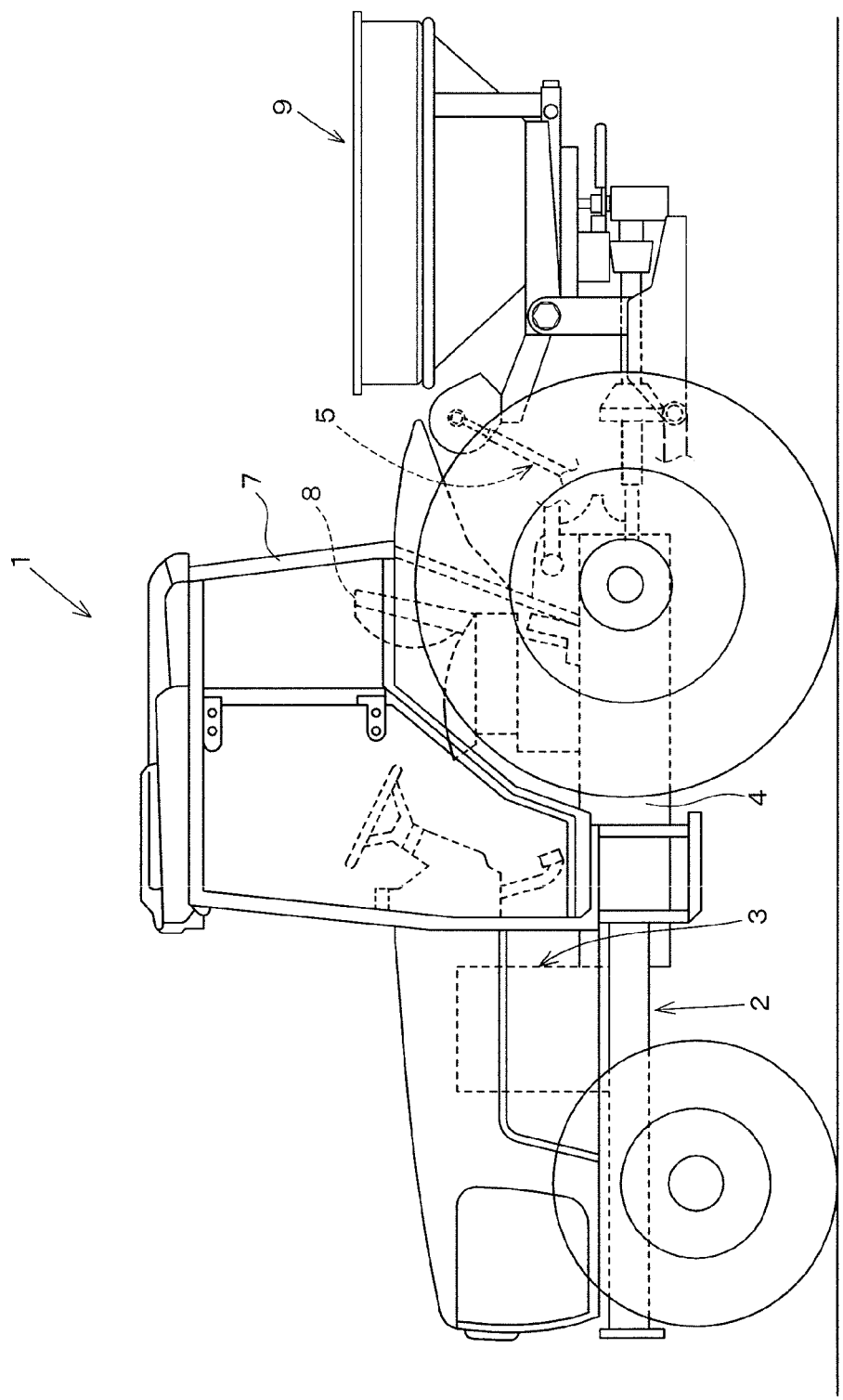
FIG. 9 is a schematic view showing an overall structure of a tractor.

First, with reference to FIG. 9, a schematic configuration of the tractor 1 will be described. FIG. 9 is a schematic view showing an overall structure of the tractor 1.

The tractor 1 is configured of a travelling vehicle (travelling car body) 2 provided with wheels at its front and rear ends, an engine 3, and a transmission 4. A standalone cabin 7 is provided in the rear of the engine 3, and a driver's seat 8 is provided in the cabin 7. A vertically movable three-point link mechanism 5 and a PTO shaft for transmitting power from the engine 3 are provided in the rear part of the travelling vehicle 2. An operating unit 9 such as a fertilizer distributor, a cultivator, an agrichemical distributor, a seed distributor, or a harvest machine can be attached to/detached from the three-point link mechanism 5. In this embodiment, as shown in FIG. 9, a fertilizer distributor is attached to the three-point link mechanism 5.

As shown in FIG. 1, the control device 20 is connected to the data collection device 30a via a vehicle communication network (for example, Controller Area Network or FlexRay) N1. The control device 20 performs driving control and work control of the tractor 1, in the driving control, controls the operation of the engine, and in the work control, controls operations including the vertical movement of the three-point link mechanism 5 and outputting of the PTO shaft (rotation number) in response to inputs from operational tools such as an operation lever and an operation switch around the driver's seat. Control signals for the driving control and the work control of the tractor 1 and various detection signals for control (for example, detection signal of a sensor) are outputted to the vehicle communication network N1, and are transmitted to each part of the tractor 1. The driving control and the work control of the control device 20 are not limited to these.

The data collection device 30a is separated from the control device 20, and is connected to the vehicle communication network N1 independently from the control device 20. A power source for the data collection device 30a is supplied from a battery mounted in the tractor 1. The data collection device 30a operates with the control device 20 while a main power source of the tractor 1 is ON, and outputs a beacon (for example, a signal including SSID indicating an access point) and notifies the mobile terminal 40a that the data collection device 30a is present on the network while the main power source of the tractor 1 is OFF.

The data collection device 30a automatically collect various data (data relating to the tractor 1) obtained through the operation of the tractor 1. For example, when a cultivator as the operating unit 9 is coupled to the rear part of the tractor 1 and the tractor 1 operates, data including rotary rotation number, rotary loads, plowing depth, engine rotation number, and vehicle speed of the cultivator is outputted to the vehicle communication network N1. The data collection device 30a obtains the data including rotary rotation number, rotary loads, plowing depth, engine rotation number, and vehicle speed via the vehicle communication network N1.

In the case where the operating unit 9 is a fertilizer distributor, an agrichemical distributor, or a seed distributor, data including vehicle speed, engine rotation number, and distribution amount (fertilizer distribution amount, agrichemical distribution amount, seed distribution amount) is outputted to the vehicle communication network N1, and the data communication device 30a obtains vehicle speed, engine rotation number, fertilizer distribution amount, agrichemical distribution amount, and seed distribution amount. Alternatively, in the case where the operating unit 9 is a harvest machine, data including vehicle speed, engine rotation number, and harvest amount is outputted to the vehicle communication network N1, and the data communication device 30a obtains vehicle speed, engine rotation number, and harvest amount.

The data collection device 30a includes a data collection unit 31 configured of a CPU or a nonvolatile memory, and collected data is stored in the data collection unit 31. Each time tractor 1 operates, data is accumulated in the data collection unit 31.

The data collection device 30a has the function of collecting data as described above, and also has a communication function of transmitting and receiving data. The data collection device 30a has the communication function and thus, is separated from the control device 20 and is connected to the vehicle communication network N1 independently from the control device 20.

Describing in detail, the data collection device 30a includes a communication processing unit 32 for transmitting and receiving data. For example, the communication processing unit 32 enables communication between the vehicle communication network N1 to which the control device 20 and the data collection device 30a belong and an external communication network (ex. wide area network) to which the mobile terminal 40a belongs, and executes various processing for realizing wireless communication between the data collection device 30a and the mobile terminal 40a including conversion of a communication protocol so as to achieve transmission and reception of data between the control device 20 and the data collection device 30a. The communication processing unit 32 executes processing for short-distance wireless communication by Wi-Fi (registered trademark), Bluetooth (registered trademark), and ZigBee (registered trademark).

In this embodiment, the communication processing unit 32 executes processing for wireless communication by Wi-Fi (Wireless Fidelity, registered trademark) conforming to the Communication Standard IEEE802.11 series. The communication processing unit 32 stores its own MAC address, a network name (SSID), an encryption key (network key), and information for authorizing authentication with the mobile terminal 40*a* therein.

On the other hand, the mobile terminal 40*a* is, for example, a smartphone (multifunctional mobile phone) or a mobile computer such as a tablet and a PC, which has a relatively high computing capability. The mobile terminal 40*a* can perform short-distance wireless communication by Wi-Fi (registered trademark), Bluetooth (registered trademark), or ZigBee (registered trademark). The mobile terminal 40*a* can also perform communication using a mobile phone line.

Wireless communication between the mobile terminal 40*a* and the data collection device 30*a* will be described below in detail.

The mobile terminal 40*a* includes a communication processing unit 41 for executing processing relating to communication. The communication processing unit 41 is configured of a communication module or the like, and includes an authentication information output unit 42 for outputting (transmitting) first authentication information for authentication of the mobile terminal 40*a* in the data collection device 30*a* to the data collection device 30*a*.

The first authentication information is information for authenticating the mobile terminal 40*a* when data collected by the data collection device 30*a* is outputted to the mobile terminal 40*a*, and includes, for example, a network key (referred to as first network key) that is information for encrypting data to be outputted (encryption key) and an authorization key (first authorization key) that is information for proving the validity of an access of the mobile terminal 40*a* to the data collection device 30*a*.

For example, when the first network key is inputted to the mobile terminal 40*a* by using an input interface of the mobile terminal 40*a*, the authentication information output unit 42 transmits the first network key to the data collection device 30*a* in a first stage. At this time, the mobile terminal 40*a* stores the first network key as the encryption key to decode encrypted data from the data collection device 30*a*.

Next, in the data collection device 30*a*, when the mobile terminal 40*a* is authenticated using the first network key to establish connection between the mobile terminal 40*a* and the data collection device 30*a*, the data collection device 30*a* requests the first authorization key to the mobile terminal 40*a*, and the authentication information output unit 42 of the mobile terminal 40*a* transmits the first authorization key to the data collection device 30*a* in a second stage. As described later, the mobile terminal 40*a* itself obtains this first authorization key from the outside such as a management server 50*a*.

The communication processing unit 32 of the data collection device 30*a* includes an authentication information storage unit 33, an authorization determination unit 34, and a data communication unit 35.

The authentication information storage unit 33 serves to store authentication information (second authentication information) for outputting data collected by the data collection device 30*a* to the mobile terminal 40*a*. In this embodiment, the authentication information storage unit 33 stores the second authentication information including a network key (referred to as second network key) that is an encryption key for encrypting data to be outputted and an authorization key (second authorization key) that is information for determining the validity of the first authorization key transmitted from the mobile terminal 40*a*. The second authorization key includes, for example, information corresponding to a serial number and a model of the tractor 1, and is previously set and stored in the authentication information storage unit 33 of the data collection device 30*a* by a manufacturer of the tractor 1, the control device 20, or the data collection device 30*a*.

The authorization determination unit 34 serves to determine whether or not at least data transmission is authorized on the basis of the second authentication information (second network key, second authorization key) stored in the authentication information storage unit 33 and the first authentication information (first network key, first authorization key) transmitted from the mobile terminal 40*a*.

Describing in detail, when the data collection device 30*a* receives the first network key transmitted from the mobile terminal 40*a*, in a first stage, the authorization determination unit 34 of the data collection device 30*a* reads the second network key stored in the authentication information storage unit 33 to authenticate the received first network key. For example, the authorization determination unit 34 determines whether or not the first network key is the same as or corresponds to the second network key, and when it is determined that the first network key is the same as or corresponds to the second network key, the data collection device 30*a* can authenticate the first network key. When the first network key is authenticated using the second network key, the authorization determination unit 34 requests the mobile terminal 40*a* to transmit the first authorization key. Then, when the data collection device 30*a* receives the first authorization key transmitted from the mobile terminal 40*a*, in a second stage, the authorization determination unit 34 reads the second authorization key stored in the authentication information storage unit 33 to authenticate the received first authorization key. When the first authorization key is authenticated using the second authorization key, the authorization determination unit 34 authorizes data transmission to the mobile terminal 40*a*.

When receiving the authorization of data transmission from the authorization determination unit 34, the data communication unit 35 reads data stored in the data collection unit 31 and transmits the read data to the mobile terminal 40*a*.

In the case where the first network key is not authenticated in the first stage, the authorization determination unit 34 does not request the first authorization key to the mobile terminal 40*a* and accordingly, the data collection device 30*a* does not transmit or receive data to or from the mobile terminal 40*a*. As a result, the mobile terminal 40*a* cannot receive data stored in the data collection unit 31 of the data collection device 30*a*.

Similarly, in the case where the first authorization key is not authenticated using the second authorization key in the second stage, the authorization determination unit 34 does not authorize data transmission to the data communication unit 35 and accordingly, the mobile terminal 40*a* cannot receive data stored in the data collection unit 31 of the data collection device 30*a*.

As described above, since the data collection device 30*a* executes the authentication processing for the mobile terminal 40*a*, data collected in the tractor 1 is transmitted to only the designated mobile terminal 40*a*, and data relating to the operation of the tractor 1 can be transmitted or received to or from the mobile terminal while ensuring the security.

Although the first authorization key is previously stored in the mobile terminal 40a in the above-mentioned embodiment, the first authorization key is obtained from the management server 50a.

The communication processing unit 41 of the mobile terminal 40a includes an identification information output unit 43. The identification information output unit 43 serves to transmit mobile terminal identification information to the management server 50a via the wide area network. The mobile terminal identification information transmitted to the management server 50a is information distinguishing (identifying) the mobile terminal 40a, and is a phone number unique to the mobile terminal 40a, for example. The mobile terminal identification information is stored in the mobile terminal 40a.

Next, the management server 50a includes a relation storage unit 51, a registration unit 52, a relation determination unit 53, and an authorization information output unit 54.

The relation storage unit 51 stores information on the agricultural machine (the tractor 1, the control device 20, and the data collection device 30a) and information on the mobile terminal 40a related to each other.

Describing in detail, the relation storage unit 51 stores agricultural machine identification information identifying the agricultural machine and the mobile terminal identification information (for example, the phone number) identifying the mobile terminal 40a, related to each other. The agricultural machine identification information is unique information for distinguishing (identifying) the tractor 1 or the data collection device 30a.

As shown in FIG. 2, the relation storage unit 51 stores the serial number and the model of the tractor for distinguishing the tractor 1, the unique serial number for distinguishing the control device 20, and the unique serial number for distinguishing the data collection device 30a, which are the agricultural machine identification information. The agricultural machine identification information may be any unique information for distinguishing the tractor 1, the control device 20, and the data collection device 30a.

Hereinafter, to distinguish the mobile terminal identification information and the agricultural machine identification information, which are stored in the relation storage unit 51, from the mobile terminal identification information and the agricultural machine identification information, which are outputted from the mobile terminal 40a, the mobile terminal identification information stored in the relation storage unit 51 is referred to as "stored mobile information", the agricultural machine identification information stored in the relation storage unit 51 is referred to as "stored agricultural machine information", the mobile terminal identification information outputted from the mobile terminal 40a is referred to as "outputted mobile information", and the agricultural machine identification information outputted from the mobile terminal 40a is referred to as "outputted agricultural machine information".

The registration unit 52 previously relates the mobile terminal identification information to the agricultural machine identification information, which are related to each other, and stores and holds the information in the relation storage unit 51. When relating the mobile terminal identification information to the agricultural machine identification information, the registration unit 52 generates (issues) the first authorization key that is the first authentication information, relates the first authorization key, the mobile terminal identification information, and the agricultural machine identification information to one another, and previously registers (records) them in the relation storage unit 51.

For example, at sales of the tractor 1, when the phone number (mobile terminal identification information) of the mobile terminal owned by the user purchasing the tractor 1 and the serial number and the model (agricultural machine identification information) of the tractor 1 are inputted to the management server 50a, the registration unit 52 relates the phone number of the mobile terminal to the serial number and the model of the tractor 1, and stores them in the relation storage unit 51. The registration unit 52 also generates the first authorization key corresponding to the phone number, and the serial number and the model of the tractor 1 and stores the first authorization key in the relation storage unit 51.

At sales of the data collection device 30a, when the phone number (mobile terminal identification information) of the mobile terminal owned by the user purchasing the data collection device 30a and the serial number and the model (agricultural machine identification information) of the data collection device 30a are inputted to the management server 50a, as in the case with the tractor 1, the registration unit 52 relates the phone number of the mobile terminal to the serial number and the model of the data collection device 30a, and stores them along with the first authorization key in the relation storage unit 51.

That is, registration unit 52 stores the mobile terminal identification information and the agricultural machine identification information, both related to each other in the relation storage unit 51, issues the first authorization key including information corresponding to the phone number of the user and the serial number and the model of the tractor 1, and stores the first authorization key.

The registration including the relation between the mobile terminal identification information and the agricultural machine identification information may be achieved by transmitting the mobile terminal identification information and the agricultural machine identification information from a computer of a sales company to the management server 50a, or may be achieved by any other method. Various information shown in FIG. 2 may be used as sales management data that is accumulated data relating to the sales of the tractor, and the mobile terminal identification information, the agricultural machine identification information, and the authentication information may be managed using the sales management data.

The relation determination unit 53 determines whether or not the outputted mobile information is related on the basis of the outputted mobile information outputted from the mobile terminal 40a (identification information output unit 43) and the stored mobile information and the stored agricultural machine information stored in the relation storage unit 51.

For example, the relation determination unit 53 determines whether or not the same stored mobile information as the outputted mobile information is stored in the relation storage unit 51. At this time, in the case where the same stored mobile information as the outputted mobile information is stored in the relation storage unit 51, the relation determination unit 53 determines that relation is made. In the case where the same stored mobile information as the outputted mobile information is not stored in the relation storage unit 51, the relation determination unit 53 determines that relation is not made.

In the case where the relation determination unit 53 determines that relation is made, the authorization information output unit 54 reads the first authorization key corresponding to the mobile terminal identification information (outputted mobile information) determined to be related from the relation storage unit 51, and outputs the first authorization key to the mobile terminal 40a. In the case where the relation determination unit 53 determines that relation is not made, the authorization information output unit 54 does not (cannot) output the first authorization key because the first authorization key corresponding to the outputted mobile information is not present.

Figure 3:
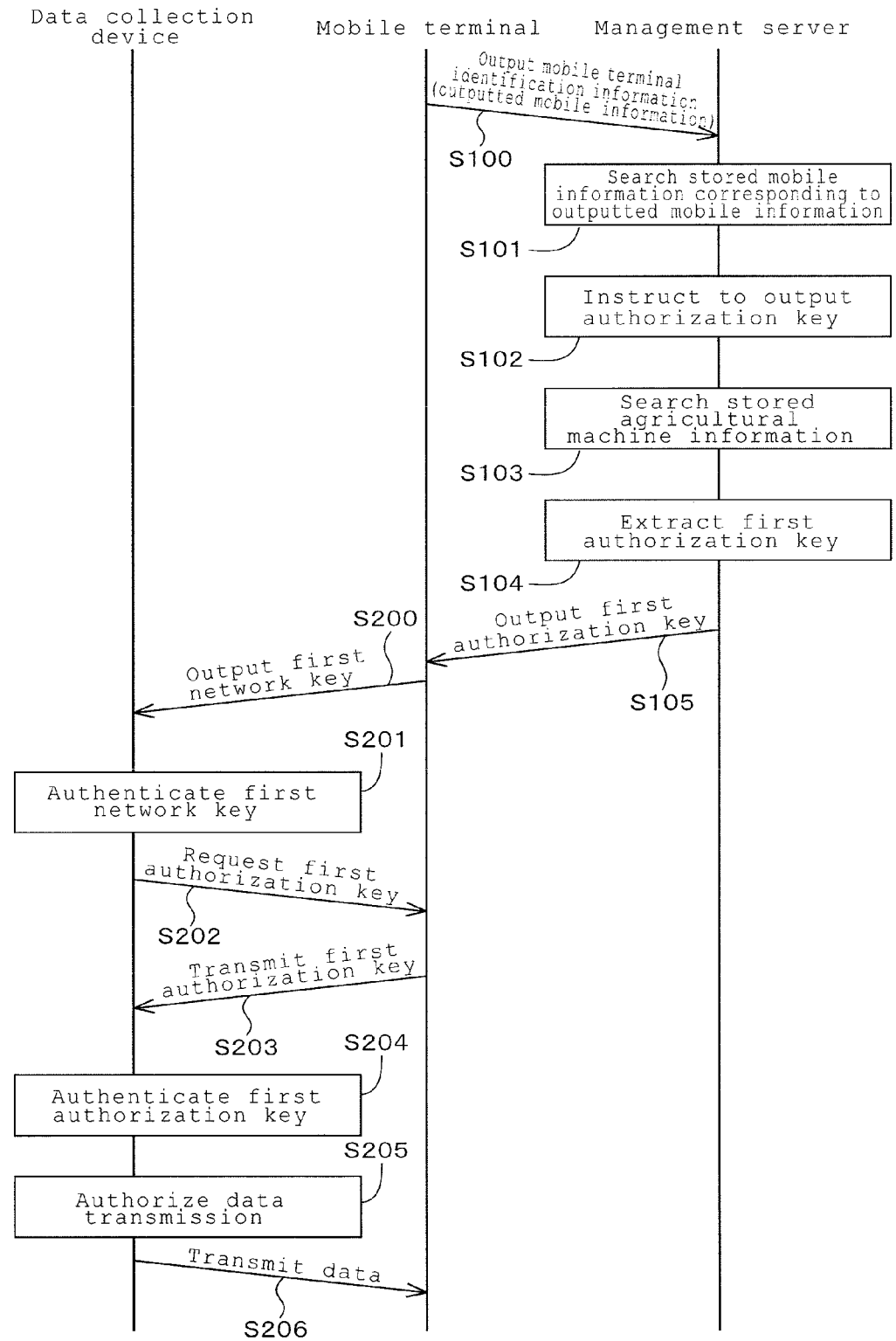
FIG. 3 is a diagram showing an operational flow of the data communication system for agricultural machine in the first embodiment.

FIG. 3 is a diagram showing the operation of the data collection device, the mobile terminal, and the management server in data communication between the data collection device and the mobile terminal. With reference to FIG. 3, the operation of the data communication system for an agricultural machine 10a will be described.

In the data communication between the data collection device 30a and the mobile terminal 40a, first, the mobile terminal 40a is connected to the management server 50a to execute processing of obtaining the first authentication information (first authorization key) necessary for authentication (acquisition processing).

In the acquisition processing, first, connection between the mobile terminal 40a and the management server 50a is established, and the identification information output unit 43 of the mobile terminal 40a outputs the mobile terminal identification information (outputted mobile information) of the mobile terminal 40a to the management server 50a (Step S100).

When the outputted mobile information is inputted to the management server 50a, the relation determination unit 53 performs a search on whether or not the stored mobile information corresponding to the outputted mobile information is present in the stored mobile information stored in the relation storage unit 51 (Step S101).

When the stored mobile information corresponding to the outputted mobile information is present in the stored mobile information stored in the relation storage unit 51, the relation determination unit 53 determines that the outputted mobile information is related and stored, and instructs the authorization information output unit 54 to output the first authorization key (Step S102).

The authorization information output unit 54 searches the stored agricultural machine information related to the stored mobile information corresponding to the outputted mobile information (Step S103). After the search of the stored agricultural machine information, the authorization information output unit 54 extracts the first authorization key related to the stored agricultural machine information from the relation storage unit 51 (Step S104). After the extraction of the first authorization key, the authorization information output unit 54 outputs the first authorization key to the mobile terminal 40a (Step S105).

In Step S101, in the case where the stored mobile information corresponding to the outputted mobile information is not present in the stored mobile information stored in the relation storage unit 51, the relation determination unit 53 determines that the relation determination unit 53 is not related. In this case, the authorization information output unit 54 does not (cannot) output the first authorization key to the mobile terminal 40a, and instead, outputs information indicating that relation (registration) is not made to the mobile terminal 40a.

Next, when the acquisition processing of the first authentication information (first authorization key) is finished, processing of authenticating the mobile terminal 40a (authentication processing) is executed between the mobile terminal 40a and the data collection device 30a.

In the authentication processing, first, the authentication information output unit 42 of the mobile terminal 40a outputs the first network key to the data collection device 30a (Step S200).

When the data collection device 30a receives the first network key, the authorization determination unit 34 of the data collection device 30a reads the second network key, and authenticates the received first network key (Step S201).

Next, when determining that the first network key is authenticated using the second network key, the authorization determination unit 34 requests the mobile terminal 40a to transmit the first authorization key (Step S202).

When receiving the request to transmit the first authorization key from the data collection device 30a, the authentication information output unit 42 of the mobile terminal 40a transmits the first authorization key obtained from the management server 50a to the data collection device 30a (Step S203).

When the data collection device 30a receives the first authorization key, the authorization determination unit 34 reads the second authorization key to determine whether or not information included in the first authorization key corresponds to information included in the second authorization key, thereby authenticating the first authorization key on the basis of the second authorization key (Step S204).

When determining that the first authorization key is authenticated based on the second authorization key when the information in the first authorization key corresponds to the information in the second authorization key, the authorization determination unit 34 authorizes data communication, that is, data transmission to the data communication unit 35 (Step S205).

When the authorization determination unit 34 authorizes data transmission, the data communication unit 35 reads data stored in the data collection unit 31, and transmits the data to the mobile terminal 40a (Step S206).

In authorizing data transmission, since data communication between the data collection device 30a and the mobile terminal 40a is authorized, necessary information can be freely exchanged between the data collection device 30a and the mobile terminal 40a. For example, assuming that the mobile terminal 40a requests harvest amount data to the data collection device 30a (data communication unit 35), in response to the request from the mobile terminal 40a, the data communication unit 35 extracts the harvest amount data from data stored in the data collection unit 31, and outputs the harvest amount data to the mobile terminal 40a. That is, the data communication unit 35 appropriately outputs data according to the content requested from the mobile terminal 40a. Conversely, the data collection device 30a (data communication unit 35) may request data transmission to the mobile terminal 40a. In this case, in response to the request from the data collection device 30a, the mobile terminal 40a outputs various data stored in the mobile terminal 40a.

As described above, in the data communication system for an agricultural machine 10a in this embodiment, the data collection device 30a capable of collecting data relating to the agricultural machine is provided separately from the control device 20, and can be removably connected to the vehicle communication network N1. Therefore, the data collection device 30a can be easily replaced to address change of the radio wave band and the communication mode. The radio waveband used for wireless communication varies according to countries, and data can be transmitted by wireless communication even in countries of different radio wave band.

Data collected through authentication of the mobile terminal is transmitted to the mobile terminal, improving the data security level.

Second Embodiment

In the first embodiment described above, aside from the authentication between the data collection device 30a and the mobile terminal 40a, the mobile terminal identification information, the agricultural machine identification information, and the first authorization key are previously registered (stored) in the relation storage unit 51 of the management server 50a, and using the information, the mobile terminal 40a obtains the first authorization key to perform authentication between the data collection device 30a and the mobile terminal 40a. However, in below-mentioned second embodiment, registration of the mobile terminal identification information and the agricultural machine identification information both related to each other, and issue of the first authorization key are performed at the same time. Differences between this embodiment and the first embodiment in configuration will be described below.

Figure 4:
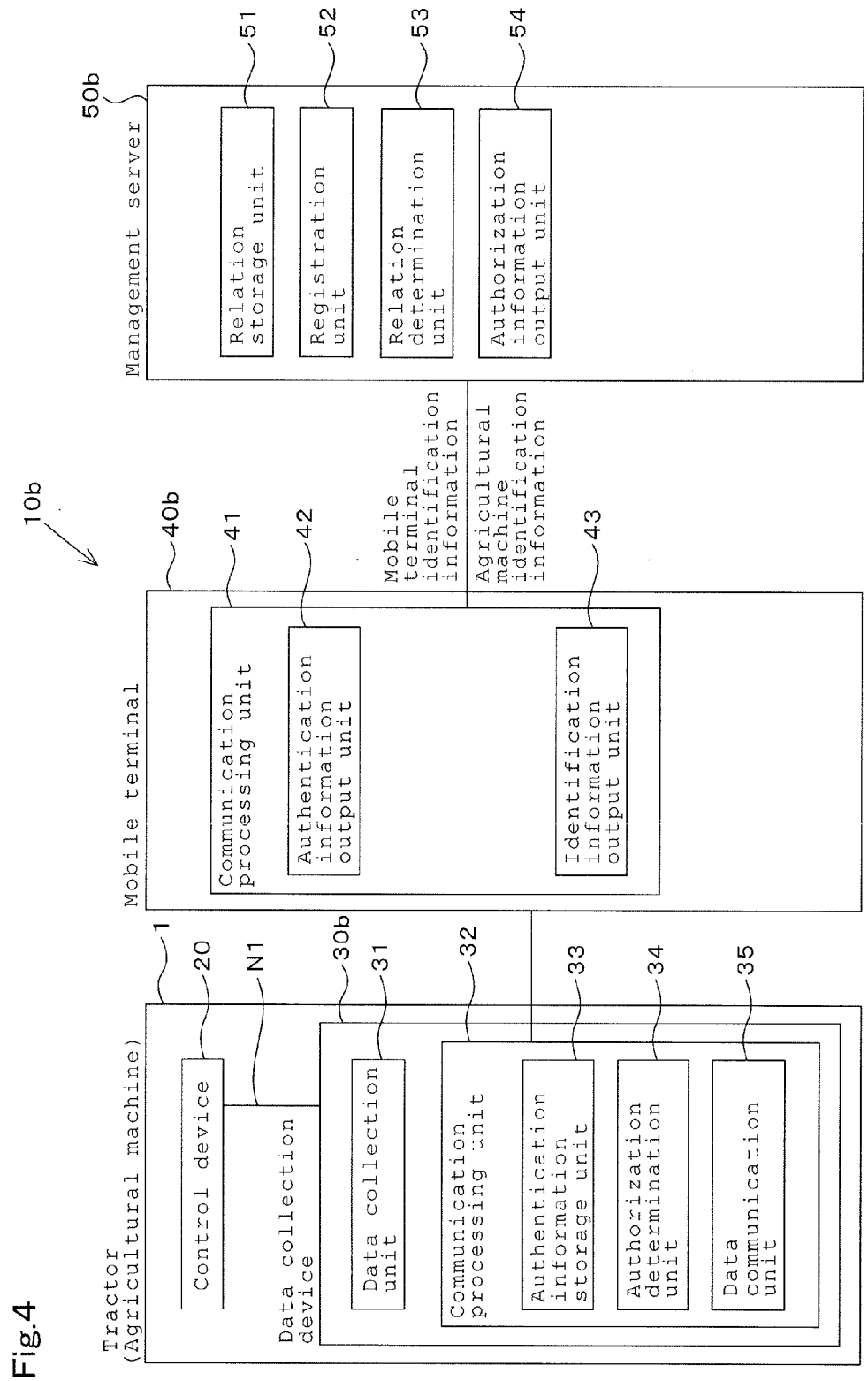
FIG. 4 is a diagram showing a schematic configuration of a data communication system for an agricultural machine in second embodiment of the present invention.

As shown in FIG. 4, the identification information output unit 43 of a mobile terminal 40b outputs the mobile terminal identification information as well as the agricultural machine identification information to a management server 50b. In the state where connection between the mobile terminal 40b and the management server 50b is established, when the agricultural machine identification information is inputted to the mobile terminal 40b by using an input interface of the mobile terminal 40b, and the agricultural machine identification information is transmitted to the management server 50b, the identification information output unit 43 outputs the inputted agricultural machine identification information along with the mobile terminal identification information to the management server 50b.

When receiving the mobile terminal identification information (outputted mobile information) and the agricultural machine identification information (outputted agricultural machine information) from the mobile terminal 40b (identification information output unit 43), the registration unit 52 of the management server 50b determines whether or not the received outputted mobile information and outputted agricultural machine information are stored and related to each other in the relation storage unit 51.

In the case where the outputted mobile information and the outputted agricultural machine information outputted from the mobile terminal 40b (identification information output unit 43) are not related to each other, the registration unit 52 relates the information and issues the first authorization key corresponding to the outputted mobile information and the agricultural machine identification information.

When the registration unit 52 issues the first authorization key corresponding to the outputted mobile information and the outputted agricultural machine information outputted from the identification information output unit 43, the relation determination unit 53 of the management server 50b determines that the outputted mobile information is related to the outputted agricultural machine information. In response to the issue of the first authorization key, the authorization information output unit 54 immediately outputs the first authorization key to the mobile terminal 40b.

Figure 5:
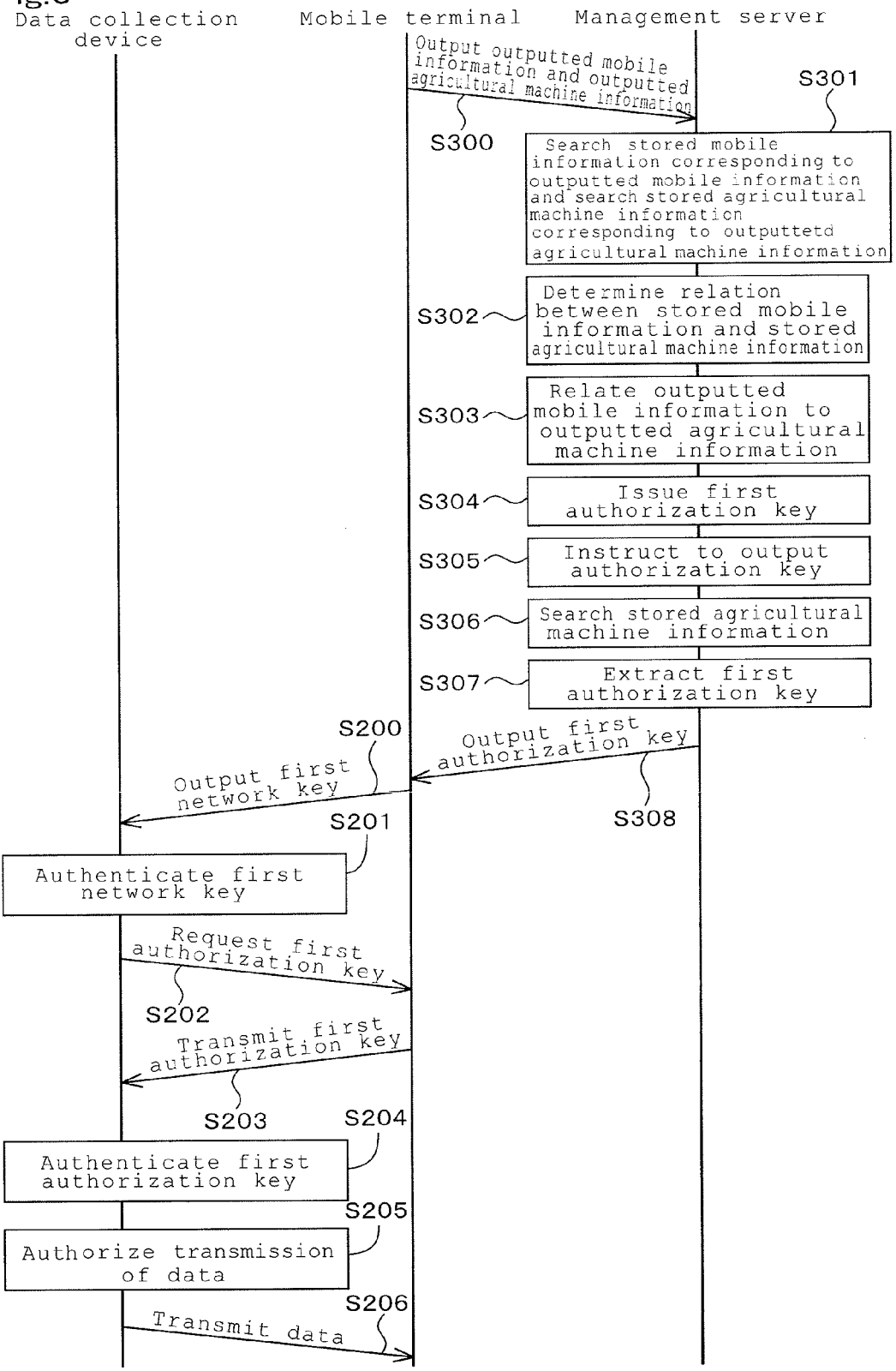
FIG. 5 is a diagram showing an operational flow of the data communication system for an agricultural machine in the second embodiment.

FIG. 5 is a diagram showing the operation of the data collection device, the mobile terminal, and the management server in a second embodiment.

First, connection between the mobile terminal 40b and the management server 50b is established and then, the identification information output unit 43 of the mobile terminal 40b outputs the mobile terminal identification information (outputted mobile information) on the mobile terminal 40b and the agricultural machine identification information (outputted agricultural machine information) to the management server 50b (Step S300).

When outputted mobile information and the outputted agricultural machine information are inputted to the management server 50b, the registration unit 52 of the management server 50b determines whether or not the stored mobile information corresponding to the outputted mobile information is present in the stored mobile information stored in the relation storage unit 51, and whether or not the stored agricultural machine information corresponding to the outputted agricultural machine information is present (Step S301).

In the case where the stored mobile information corresponding to the outputted mobile information, and the stored agricultural machine information corresponding to the outputted agricultural machine information are present in the information stored in the relation storage unit 51, the registration unit 52 of the management server 50b determines whether or not the stored mobile information is related to the stored agricultural machine information (Step S302).

In the case where the stored mobile information is related to the stored agricultural machine information, the first authorization key is generated as a result of the relation between the outputted mobile information and the outputted agricultural machine information, the registration unit 52 of the management server 50b shifts processing to the relation determination unit 53 without generating (issuing) the first authorization key, and the relation determination unit 53 determines that the relation is made.

Conversely, in the case where the stored mobile information is not related to the stored agricultural machine information, the registration unit 52 of the management server 50b relates the outputted mobile information with the outputted agricultural machine information (Step S303), stores the relation in the relation storage unit 51, and generates (issues) the first authorization key corresponding to the outputted mobile information and the outputted agricultural machine identification information (Step S304).

Figure 6:
FIG. 6 is a diagram showing a registration procedure of agricultural machine identification information and mobile terminal identification information in the second embodiment.

For example, as shown in FIG. 6A, it is assumed that the relation storage unit 51 stores the stored mobile information and the stored agricultural machine information therein. Further, it is assumed that the mobile terminal 40b outputs "012-9354-2973" as the outputted mobile information, and "20891 (serial number of the tractor), M115A (the model of the tractor)" as the outputted agricultural machine information to the management server 50b.

Referring to the relation storage unit 51, the outputted mobile information "012-9354-2973" and the outputted agricultural machine information "20891, M115A", which are outputted from the mobile terminal 40b, are stored in the relation storage unit 51 (are present in the relation storage unit 51), but "012-9354-2973" is related to another stored agricultural machine information "10013, M115A".

That is, the outputted mobile information ("012-9354-2973") and the outputted agricultural machine information ("20891, M115A") that are outputted from the mobile terminal 40b are not related to each other in the relation storage unit 51.

Thus, as shown in FIG. 6B, the registration unit 52 of the management server 50*b* stores the outputted mobile information "012-9354-2973" and the outputted agricultural machine information "2089, M115A", both related to each other in the relation storage unit 51, and generates (issues) the first authorization key corresponding to the information.

When the registration unit 52 generates the first authorization key, the relation determination unit 53 determines that the outputted mobile information "012-9354-2973" is related to the outputted agricultural machine information "20891, M115A", and instructs the authorization information output unit 54 to output the first authorization key (Step S305).

The authorization information output unit 54 searches the stored agricultural machine information related to the stored mobile information corresponding to the outputted mobile information (Step S306). After the search for the stored agricultural machine information, the authorization information output unit 54 extracts the first authorization key related to the stored agricultural machine information from the relation storage unit 51 (Step S307). After the extraction of the first authorization key, the authorization information output unit 54 outputs the extracted first authorization key to the mobile terminal 40*b* (Step S308).

At the time of Step S304, the relation among the outputted mobile information, the outputted agricultural machine information, and the first authorization key is obvious. Accordingly, when the relation determination unit 53 instructs the authorization information output unit 54 to output the first authorization key, the processing in Step S306 and Step S307 may be omitted.

Processing of a data collection device 30*b* after outputting of the first authorization key to the mobile terminal 40*b* is the same as the processing (Step S200 to Step S206) of the data collection device 30*a* in first embodiment and thus, description thereof is omitted.

As described above, in the data communication system for an agricultural machine 10*b* in this embodiment, by merely outputting (transmitting) the mobile terminal identification information and the agricultural machine identification information from the mobile terminal 40*b* (identification information output unit 43) to the management server 50*b*, the mobile terminal identification information and the agricultural machine identification information can be registered in the management server 50*b*, and the first authorization key can be obtained at the same time. The first authorization key readily enables the data communication between the data collection device 30*b* and the mobile terminal 40*b*.

Third Embodiment

In a third embodiment, in authentication between a data collection device 30*c* and a mobile terminal 40*c*, the mobile terminal 40*c* obtains the agricultural machine identification information from the agricultural machine, and transmits the obtained agricultural machine identification information to the management server. Differences between this embodiment and the first and second embodiments in configuration will be described below.

Figure 7:
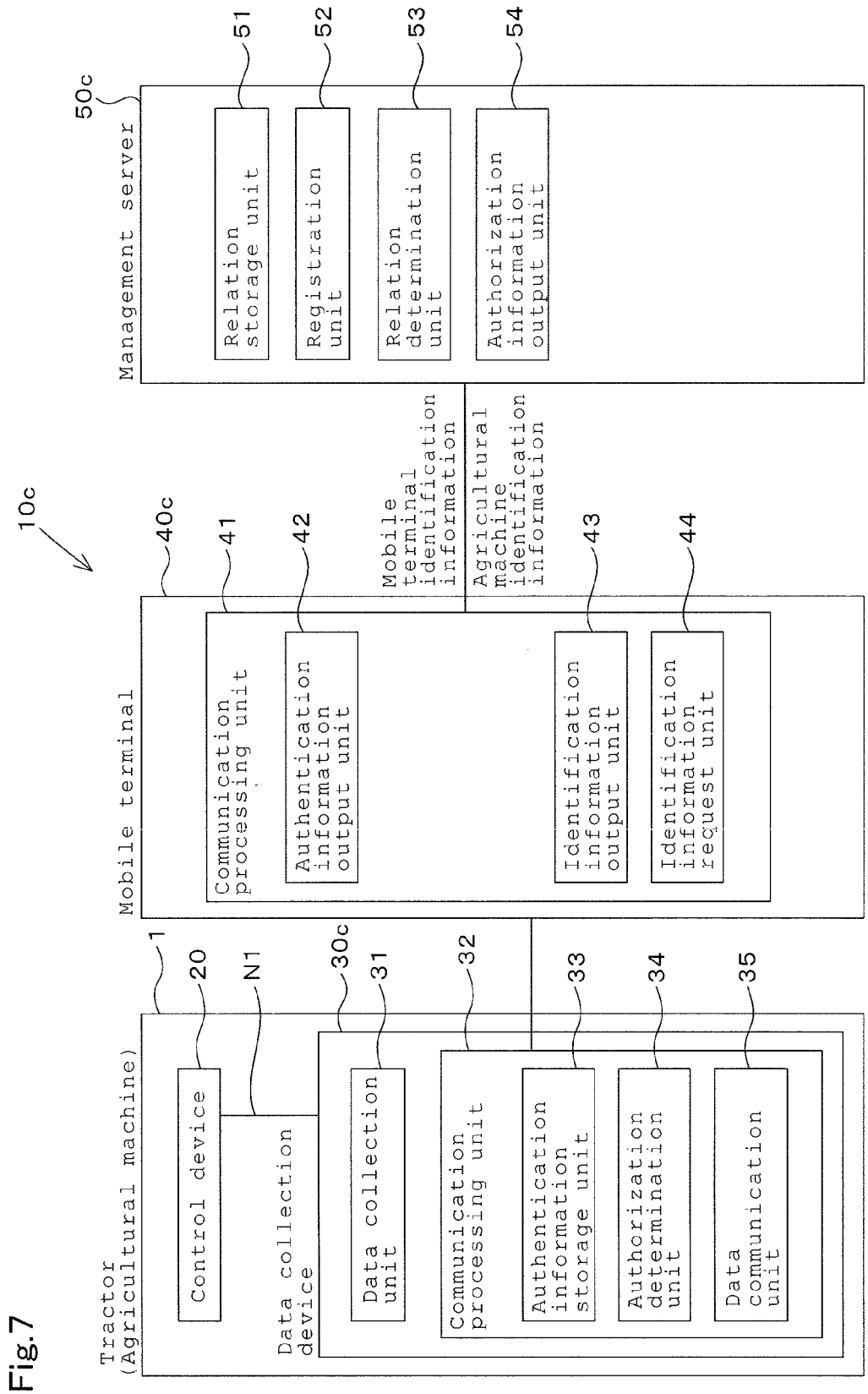
FIG. 7 is a diagram showing a schematic configuration of a data communication system for an agricultural machine in a third embodiment of the present invention.

As shown in FIG. 7, the mobile terminal 40*c* includes an identification information request unit 44 for requesting the agricultural machine identification information to the data collection device 30*c*. For example, in the authentication between the data collection device 30*c* and the mobile terminal 40*c*, the authentication information output unit 42 of the mobile terminal 40*c* outputs the first network key as the first authentication information to the data collection device 30*c* and then, the identification information request unit 44 requests the agricultural machine identification information to the data collection device 30*c*. When the identification information request unit 44 obtains the agricultural machine identification information from the data collection device 30*c*, the identification information output unit 43 transmits the mobile terminal identification information along with the obtained agricultural machine identification information to a management server 50*c*.

On the other hand, the authentication information storage unit 33 of the data collection device 30*c* stores the agricultural machine identification information therein. In response to the request from the identification information request unit 44 of the mobile terminal 40*c*, the data collection device 30*c* outputs the agricultural machine identification information stored in the data collection device 30*c* (authentication information storage unit 33) to the mobile terminal 40*c*.

Figure 8:
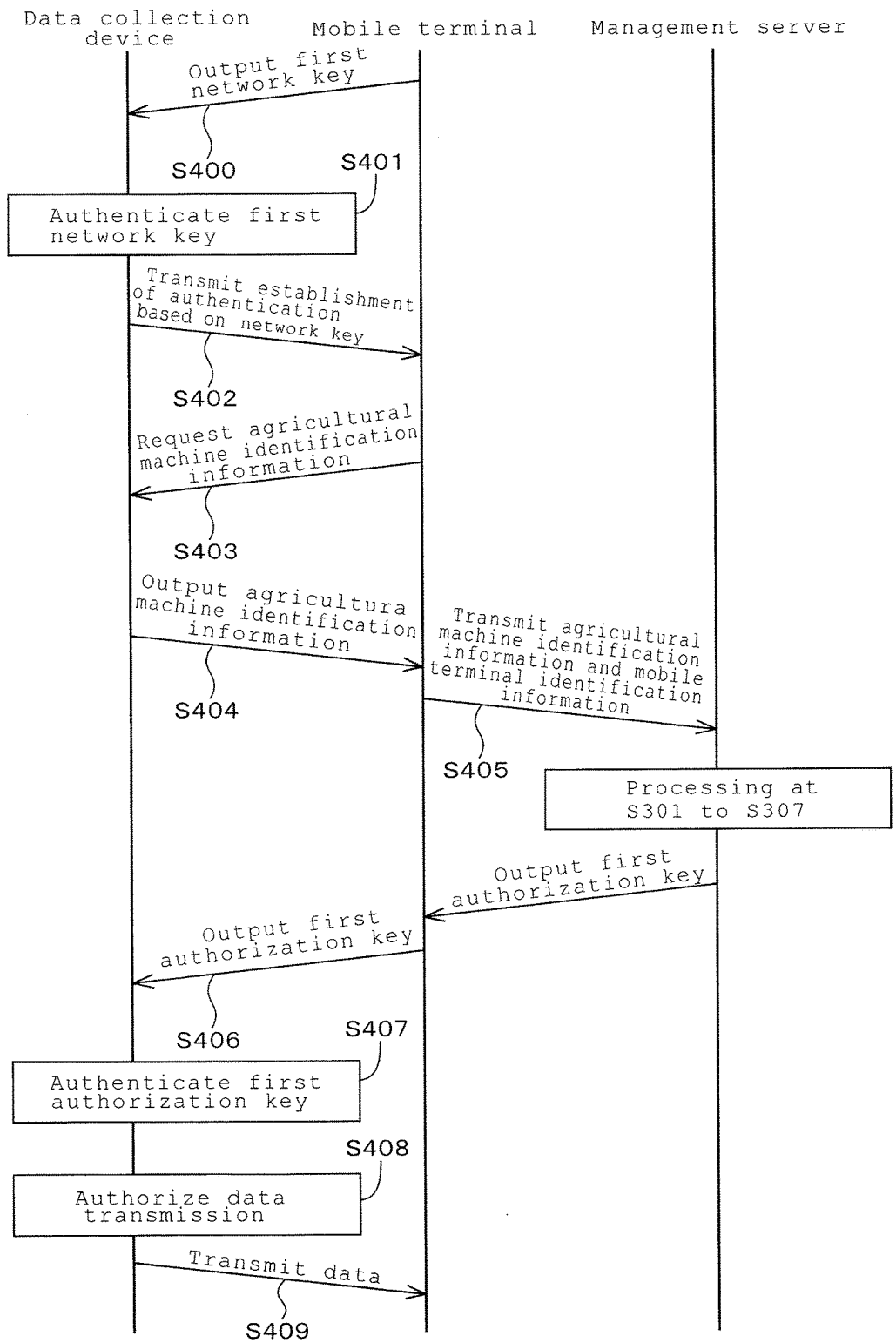
FIG. 8 is a diagram showing an operational flow of the data communication system for an agricultural machine in the third embodiment.

FIG. 8 is a diagram showing the operation of the data collection device and the mobile terminal in the third embodiment. The operation of the management server is the same as in the first embodiment or the second embodiment and thus, description thereof is omitted.

When the authentication information output unit 42 of the mobile terminal 40*c* outputs the first network key to the data collection device 30*c* (Step S400), and the data collection device 30*c* receives the first network key, the authorization determination unit 34 of the data collection device 30*c* reads the second network key, and authenticates the received first network key (Step S401).

Next, when determining that the first network key is authenticated using the second network key, the authorization determination unit 34 transmits the authentication based on the network key to the mobile terminal (Step S402).

When the data collection device 30*c* requests the mobile terminal 40*c* to transmit the first authorization key, the identification information request unit 44 of the mobile terminal 40*c* requests the agricultural machine identification information to the data collection device 30*c* (Step S403).

When receiving the request of the agricultural machine identification information from the mobile terminal 40*c*, the authorization determination unit 34 of the data collection device 30*c*-outputs the agricultural machine identification information stored in the authentication information storage unit 33 to the mobile terminal 40*c* (Step S404). When the mobile terminal 40*c* receives the agricultural machine identification information outputted from the authorization determination unit 34 of the data collection device 30*c*, the identification information output unit 43 of the mobile terminal 40*c* transmits the received agricultural machine identification information and mobile terminal identification information to the management server 50*c* (Step S405).

When receiving the first authorization key transmitted from management server 50*c*, the authentication information output unit 42 of the mobile terminal 40*c* transmits the received first authorization key to the data collection device 30*c* (Step S406).

When the data collection device 30*c* receives the first authorization key, the authorization determination unit 34 reads the second authorization key, and authenticates the received first authorization key (Step S407). When the first authorization key is authenticated using the second authorization key, the authorization determination unit 34 authorizes the data communication unit 35 to transmit data (Step S408).

When the authorization determination unit 34 authorizes data transmission, the data communication unit 35 reads data stored in the data collection unit 31, and transmits the read data to the mobile terminal 40c (Step S409).

As described above, in the data communication system for an agricultural machine 10c in this embodiment, acquisition of data collected in the data collection device 30c requires the agricultural machine identification information saved in the tractor (agricultural machine), improving the security level.

It should be considered that the disclosed embodiments are illustrative in all points, and are not limitative. The scope of the present invention is defined by the claims of the invention rather than the description, and includes all modifications in equivalents of the claims of the invention.

Although the agricultural machine has been described in the embodiments, the data communication system of the present invention can apply to construction machines such as backhoes.

REFERENCE SIGNS LIST

1: Agricultural machine (tractor)
2: Travelling vehicle (travelling car body)
3: Engine
4: Transmission
5: Three-point link mechanism
7: Cabin
8: Driver's seat
9: Operating unit
10: Data communication system
30a to 30c: Data collection device
31: Data collection unit
32: Communication unit (communication processing unit)
33: Authentication information storage unit
34: Authorization determination unit
35: Data communication unit
40a to 40c: Mobile terminal
41: Communication unit (communication processing unit)
42: Authentication information output unit
43: Identification information output unit
44: Identification information request unit
50a to 50c: Management server
51: Relation storage unit
52: Registration unit
53: Relation determination unit
54: Authorization information output unit

The invention claimed is:
1. A data communication system for an agricultural machine, comprising:
a data collection device collecting:
data relating to an agricultural machine mounting an operating unit to be used for an operation; and
other data relating to the operating unit of the agricultural machine;
the operating unit is connected to a vehicle communication network included in the agricultural machine;
a mobile terminal configured to receive the data and the other data collected by the data collection device by wireless communication; and
a server to communicate with the mobile terminal,
wherein the data collection device is removably connected to a vehicle communication network separately from a control device configured to control operation of the agricultural machine, the control device connecting to the vehicle communication network installed in the agricultural machine, wherein the data collection device includes:
a data collection unit collecting the data of the agricultural machine, the data including:
a first data outputted to the vehicle communication network by the control device, the first data including a control signal and a detection signal to be used for the control of the operation of the agricultural machine; and
a second data outputted to the vehicle communication network by the operating unit, the second data relating to the operating unit;
an authorization determination unit authenticating the mobile terminal based on a first authentication information outputted by the mobile terminal and a second authentication information preliminarily stored and to determine whether or not the collected data including the first data and the second data is transmitted to the mobile terminal by wireless communication; and
a data communication unit outputting an agricultural machine identification information from the data collection device to the mobile terminal before the authorization determination unit determines the transmission of the data and before the mobile terminal receives the first authentication information from the server, the agricultural machine identification information identifying at least one of the agricultural machine and the data collection unit and to transmit the data including the first data and the second data to the mobile terminal by wireless communication when the authorization determination unit authorizes transmission of the data after the agricultural machine identification information outputted from the mobile terminal is received and after the mobile terminal receives the first authentication information from the server,
wherein the mobile terminal includes:
an authentication information output unit outputting, after receiving the first authentication information transmitted from the server, the received first authentication information to the data collection device; and
an identification information output unit outputting the agricultural machine identification information and a mobile terminal identification information to the server before the authentication between the first authentication information and the second authentication information and after obtaining the agricultural machine identification information transmitted by the data communication unit, the mobile terminal identification information identifying the mobile terminal, the agricultural machine identification information being outputted from the data communication unit, and
wherein the server includes:
a relation storage unit storing and relating the agricultural machine identification information and the mobile terminal identification information to each other,
a relation determination unit determining, before the authentication by the authorization determination unit between the first authentication information and the second authentication information, whether or not the mobile terminal identification information outputted from the identification information output unit is related to the agricultural machine identification information based on the mobile terminal identification information outputted from the identification information output unit of the mobile terminal and on the mobile terminal identification information and the agricultural machine identification information both stored in the relation storage unit, an authorization information output unit outputting, to the mobile terminal, the first authentication information corresponding to the mobile terminal identification information when the relation determination unit determines that the relation is made before the authentication between the first authentication information and the second authentication information and before the authentication information output unit outputs the first authentication information to the data collection device, and a registration unit storing and relating the mobile terminal identification information and the agricultural machine identification information to each other in the relation storage unit upon reception of the mobile terminal identification information and the agricultural machine identification information each outputted from the identification information output unit of the mobile terminal, and to issue the first authentication information.

2. The data communication system for the agricultural machine according to claim 1, wherein the mobile terminal includes an identification information request unit requesting the agricultural machine identification information to the data collection device, and wherein the data collection device outputs the agricultural machine identification information to the mobile terminal in accordance with the request from the identification information request unit, the agricultural machine identification information being stored in the data collection device.

3. The data communication system for the agricultural machine according to claim 1, wherein:

the authentication information output unit outputs, as the first authentication information, a first network key and a first authorization key other than the first network key, the data collection device stores, as a second information, a second network key and a second authorization key other than the second network key, and the authorization determination unit authenticates, in a first stage, the first network key outputted from the authentication information output unit with the second network key, authenticates, in a second stage after establishment of the authentication in the first stage, the first authorization key outputted from the authentication information output unit with the second authorization key, and authorizes data transmission upon establishment of the authentication between the first authorization key and the second authorization key.

* * * * *